United States Patent
Wang

(10) Patent No.: US 10,527,728 B2
(45) Date of Patent: Jan. 7, 2020

(54) APPARATUS AND METHOD FOR RANGE MEASUREMENT

(71) Applicant: Samsung Electronics Co., Ltd., Gyeonggi-do (KR)

(72) Inventor: Yibing Michelle Wang, Temple City, CA (US)

(73) Assignee: Samsung Electronics Co., Ltd (KR)

( * ) Notice: Subject to any disclaimer, the term of this patent is extended or adjusted under 35 U.S.C. 154(b) by 436 days.

(21) Appl. No.: 15/498,096

(22) Filed: Apr. 26, 2017

(65) Prior Publication Data
US 2018/0217261 A1 Aug. 2, 2018

Related U.S. Application Data
(60) Provisional application No. 62/451,134, filed on Jan. 27, 2017.

(51) Int. Cl.
| | | |
|---|---|---|
| *G01S 17/00* | (2006.01) | |
| *G01S 17/89* | (2006.01) | |
| *H04N 13/204* | (2018.01) | |

(52) U.S. Cl.
CPC ............ *G01S 17/89* (2013.01); *G01S 7/4861* (2013.01); *G01S 7/4865* (2013.01); *H04N 13/204* (2018.05)

(58) Field of Classification Search
USPC ........................................................ 356/4.01
See application file for complete search history.

(56) References Cited

U.S. PATENT DOCUMENTS

| | | | | |
|---|---|---|---|---|
| 6,037,586 A | * | 3/2000 | Baril ................... | H01J 49/408 250/287 |
| 7,262,402 B2 | | 8/2007 | Niclass et al. | |

(Continued)

FOREIGN PATENT DOCUMENTS

| | | |
|---|---|---|
| DE | 102004037137 | 3/2006 |
| EP | 2159603 | 1/2008 |
| JP | 2013104784 | 5/2013 |

OTHER PUBLICATIONS

U.S. Office Action dated Jul. 11, 2018 issued in related U.S. Appl. No. 14/992,671, 8 pages.

(Continued)

*Primary Examiner* — James R Hulka
(74) *Attorney, Agent, or Firm* — The Farrell Law Firm, P.C.

(57) ABSTRACT

An apparatus and a method. The apparatus includes a single-photon avalanche diode (SPAD) circuit configured to detect a photon, including a first input for receiving a first voltage (VSPAD), a second input for receiving a first signal (SHUTTER), a third input for receiving a second voltage (VDD), and an output; a logic circuit configured to latch the detected photon, including a first input connected to the output of the SPAD circuit, a second input for receiving a second signal (TXRMD), and an output; and a pinned photo diode (PPD) circuit configured to record a time of flight (TOF) of the detected photon, including a first input connected to the output of the logic circuit, a second input for receiving a third signal (VTX), a third input for receiving a fourth signal (RST), a fourth input for receiving a third voltage (VPIX), a fifth input for receiving a fifth signal (SEL), and an output.

20 Claims, 9 Drawing Sheets

(56) References Cited

U.S. PATENT DOCUMENTS

| | | | |
|---|---|---|---|
| 7,852,461 B2 | 12/2010 | Yahav | |
| 8,355,117 B2* | 1/2013 | Niclass | G01C 3/08 356/3.01 |
| 8,633,431 B2 | 1/2014 | Kim | |
| 8,698,084 B2 | 4/2014 | Jiang et al. | |
| 9,006,641 B2 | 4/2015 | Drader | |
| 9,082,676 B2 | 7/2015 | Kurokawa | |
| 9,431,439 B2* | 8/2016 | Soga | G01S 7/4865 |
| 9,729,860 B2* | 8/2017 | Cohen | G01B 11/22 |
| 9,874,629 B2* | 1/2018 | Kostamovaara | G01S 17/107 |
| 10,061,028 B2* | 8/2018 | Koppal | G01S 17/89 |
| 2001/0046317 A1 | 11/2001 | Kamon et al. | |
| 2006/0192086 A1* | 8/2006 | Niclass | H01L 27/14647 250/214.1 |
| 2007/0182949 A1 | 8/2007 | Niclass | |
| 2009/0128833 A1* | 5/2009 | Yahav | G01S 17/023 356/623 |
| 2009/0263144 A1* | 10/2009 | McKinney | H04B 10/2507 398/214 |
| 2011/0058153 A1* | 3/2011 | Van Nieuwenhove | G01S 17/08 356/5.01 |
| 2012/0075615 A1* | 3/2012 | Niclass | G01S 7/4814 356/5.01 |
| 2013/0020494 A1* | 1/2013 | Ofuji | H04N 5/32 250/394 |
| 2013/0062522 A1* | 3/2013 | Jiang | H01L 27/14609 250/338.4 |
| 2013/0120623 A1* | 5/2013 | Kim | H04N 3/155 348/294 |
| 2013/0153754 A1* | 6/2013 | Drader | G01S 17/026 250/208.2 |
| 2013/0175435 A1* | 7/2013 | Drader | G01C 3/08 250/208.2 |
| 2013/0193546 A1* | 8/2013 | Webster | H01L 27/1443 257/438 |
| 2013/0234027 A1* | 9/2013 | Kurokawa | H01L 27/14643 250/338.4 |
| 2014/0070867 A1* | 3/2014 | Dutton | H03K 5/1534 327/355 |
| 2014/0103196 A1 | 4/2014 | Soga et al. | |
| 2014/0231630 A1* | 8/2014 | Rae | G01S 17/10 250/214.1 |
| 2014/0231631 A1* | 8/2014 | Moore | G01S 17/10 250/214.1 |
| 2014/0347443 A1 | 11/2014 | Cohen et al. | |
| 2015/0062558 A1 | 3/2015 | Koppal et al. | |
| 2015/0177369 A1 | 6/2015 | Kostamovaara | |
| 2016/0240579 A1* | 8/2016 | Sun | H01L 27/14647 |
| 2016/0291316 A1* | 10/2016 | Mellot | G01J 1/44 |
| 2017/0030769 A1* | 2/2017 | Clemens | G01J 1/46 |
| 2017/0097417 A1* | 4/2017 | Wang | H03K 19/0016 |
| 2018/0017632 A1* | 1/2018 | Moore | G01R 31/40 |
| 2018/0038945 A1* | 2/2018 | Zhuang | G01S 7/4863 |
| 2018/0045816 A1* | 2/2018 | Jarosinski | G01S 7/4814 |
| 2018/0128921 A1* | 5/2018 | Mattioli Della Rocca | G01S 17/89 |
| 2018/0156896 A1* | 6/2018 | O'Keeffe | G01S 7/4817 |
| 2018/0176492 A1* | 6/2018 | Bamji | H04N 5/363 |
| 2018/0306909 A1* | 10/2018 | Seliuchenko | G01S 17/89 |

OTHER PUBLICATIONS

U.S. Office Action dated Jul. 19, 2018 issued in related U.S. Appl. No. 14/992,671, 9 pages.

O'Toole et al., Homogeneous Codes for Energy-Efficient Illumination and Imaging, Aug. 13, 2015, University of Toronto.

Sgrott et al., A 134-pixel CMOS Sensor for Combined Time-of-Flight and Optical Triangulation 3-D Imaging, 1. Publication: ESSCIRC,2009. ESSCIRC '09. Proceedings of, pp. 208-211 Date of Conference: Sep. 14-18, 2009 DOI:10.1109/ESSCIRC.2009.5325938 Print ISBN:978-1-4244-4354-3, Publisher:IEEE Located via: ProQuest Sep. 18, 2009.

U.S. Office Action dated Jan. 10, 2018 issued in related U.S. Appl. No. 14/992,671, 14 pages.

* cited by examiner

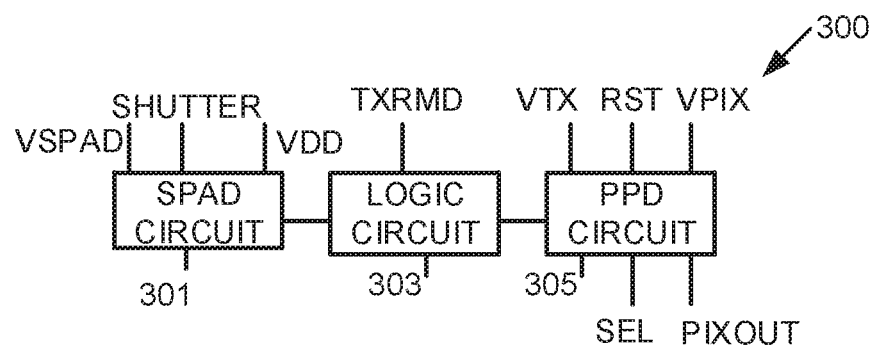
FIG. 3
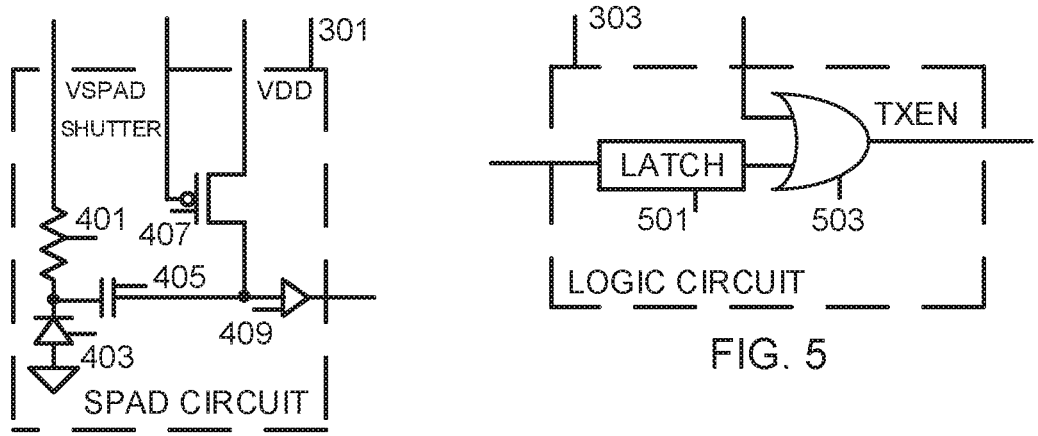
FIG. 4
FIG. 5
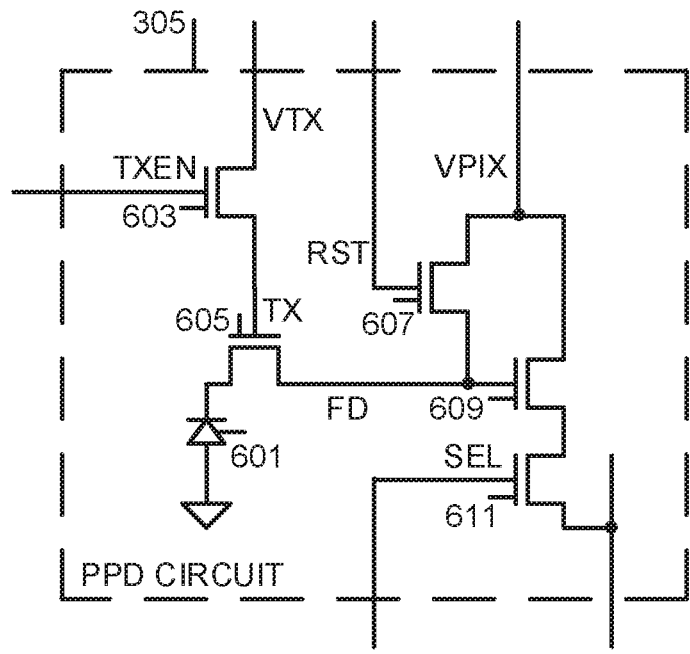
FIG. 6

US 10,527,728 B2

APPARATUS AND METHOD FOR RANGE MEASUREMENT

PRIORITY

This application claims priority under 35 U.S.C. § 119(e) to a U.S. Provisional Patent Application filed on Jan. 27, 2017 in the United States Patent and Trademark Office (USPTO) and assigned Ser. No. 62/451,134, the entire contents of which are incorporated herein by reference.

FIELD

The present disclosure relates generally to an apparatus and method for range measurement, and more particularly, to an apparatus and method for direct time-of-flight (TOF) range measurement.

BACKGROUND

Three-dimensional (3D) imaging systems are increasingly being used in a wide variety of applications such as, for example, high speed 3D imaging systems for advanced driver assistant systems (ADAS) and high speed 3D imaging systems for autonomous navigation.

Existing 3D imaging technologies may include, for example, TOF based range imaging, stereo vision systems, and structured light (SL) methods.

In the TOF method, range (or distance) to a 3D object is resolved based on the known speed of light, by measuring the round-trip time it takes for a light signal to travel between a camera and the 3D object for each point of the image. A TOF camera may use a scannerless approach to capture the entire scene with each laser or light pulse. Some example applications of the TOF method may include advanced automotive applications such as active pedestrian safety or precrash detection based on distance images in real time, to track movements of humans such as during interaction with games on video game consoles, in industrial machine vision to classify objects and help robots find the items such as items on a conveyor belt, and so on.

In stereoscopic imaging or stereo vision systems, two cameras—displaced horizontally from one another—are used to obtain two differing views on a scene or a 3D object in the scene. By comparing these two images, the relative depth information can be obtained for the 3D object. Stereo vision is highly important in fields such as robotics, to extract information about the relative position of 3D objects in the vicinity of autonomous systems/robots. Other applications for robotics include object recognition, where stereoscopic depth information allows a robotic system to separate occluding image components, which the robot may otherwise not be able to distinguish as two separate objects—such as one object in front of another, partially or fully hiding the other object. 3D stereo displays are also used in entertainment and automated systems.

In the SL approach, the 3D shape of an object may be measured using projected light patterns and a camera for imaging. In the SL method, a known pattern of light—often grids or horizontal bars or patterns of parallel stripes—is projected onto a scene or a 3D object in the scene. The projected pattern may get deformed or displaced when striking the surface of the 3D object. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging may be used in different applications such as, for example, by a police force to photograph fingerprints in a 3D scene, inline inspection of components during a production process, in health care for live measurements of human body shapes or the micro structures of human skin, and the like.

SUMMARY

According to one embodiment, an apparatus includes a single-photon avalanche diode (SPAD) circuit configured to detect a photon, including a first input for receiving a first voltage (VSPAD), a second input for receiving a first signal (SHUTTER), a third input for receiving a second voltage (VDD), and an output; a logic circuit configured to latch the detected photon, including a first input connected to the output of the SPAD circuit, a second input for receiving a second signal (TXRMD), and an output; and a pinned photo diode (PPD) circuit configured to record a TOF of the detected photon, including a first input connected to the output of the logic circuit, a second input for receiving a third signal (VTX), a third input for receiving a fourth signal (RST), a fourth input for receiving a third voltage (VPIX), a fifth input for receiving a fifth signal (SEL), and an output.

According to one embodiment, an apparatus includes a SPAD circuit configured to detect a photon, including a first input for receiving a first voltage (VSPAD), a second input for receiving a first signal (SHUTTER), a third input for receiving a second voltage (VDD), and an output; a logic circuit configured to latch the detected photon, including a first input connected to the output of the SPAD circuit, a second input for receiving a second signal (TXRMD), and an output; and a PPD circuit configured to record a TOF of the detected photon, including a first input connected to the output of the logic circuit, a second input connected to the second input of the logic circuit, a third input for receiving a third signal (VTX), a fourth input for receiving a fourth signal (RST), a fifth input for receiving a third voltage (VPIX), a sixth input for receiving a fifth signal (SEL), a first output, and a second output.

According to one embodiment, a method includes receiving a photon, by SPAD circuit; generating, by the SPAD circuit, a pulse; latching, by a logic circuit, the generated pulse; receiving, by a PPD circuit, a ramped voltage (VTX) for controlling a transfer of charge from a PPD; resetting a node FD by the PPD circuit; transferring charge to FD by the PPD circuit; receiving a pixel voltage (VPIX) by the PPD circuit; and outputting a charge in FD and a charge remaining in the PPD by the PPD circuit as PIXOUT1 and PIXOUT2, respectively.

According to one embodiment, a method receiving a photon, by a SPAD circuit; generating, by the SPAD circuit, a pulse; latching, by a logic circuit, the generated pulse; receiving, by a PPD circuit, a ramped voltage (VTX) for controlling a transfer of charge from a PPD; resetting a first node (FD1) and a second node (FD2) by the PPD circuit, wherein FD1 has a first capacitance, and FD2 has a second capacitance equal to the first capacitance of FD1; transferring charge from the PPD to FD1 by the PPD circuit; receiving a pixel voltage (VPIX) by the PPD circuit; outputting a charge in FD1 by the PPD circuit as a first voltage PIXOUT1; transferring charge remaining in the PPD to FD2 by the PPD circuit; and outputting a charge in FD2 by the PPD circuit as a second voltage PIXOUT2.

According to one embodiment, a method of manufacturing an apparatus includes forming the apparatus on a wafer or a package with at least one other apparatus, wherein the apparatus includes a SPAD circuit, a logic circuit, and a PPD circuit; and testing the apparatus, wherein testing the coarse timing and frequency synchronization apparatus includes testing the apparatus using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include an apparatus includes a SPAD circuit, a logic circuit, and a PPD circuit; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 3 illustrates an exemplary schematic diagram of a time-resolving sensor, according to one embodiment;

FIG. 4 illustrates an exemplary schematic diagram of a SPAD circuit of the time-resolving sensor of FIG. 3, according to one embodiment;

FIG. 5 illustrates an exemplary schematic diagram of a logic circuit of the time-resolving sensor of FIG. 3, according to one embodiment;

FIG. 6 illustrates an exemplary schematic diagram of a PPD circuit of the time-resolving sensor of FIG. 3, according to one embodiment;

DETAILED DESCRIPTION OF EMBODIMENTS OF THE PRESENT DISCLOSURE

Figure 1:
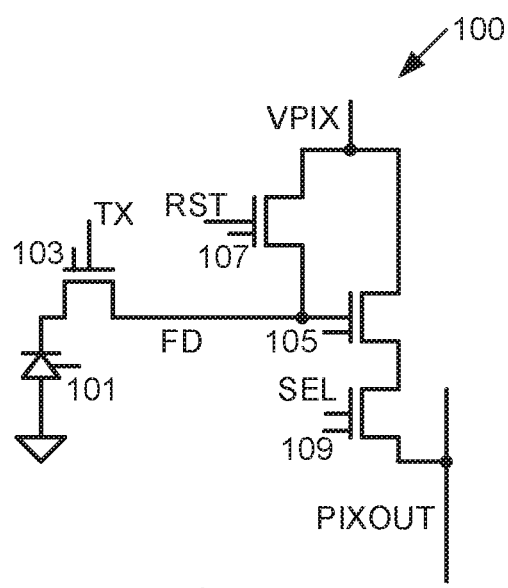
FIG. 1 illustrates an exemplary schematic diagram of a four-transistor PPD pixel, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclosure provides improved vision for drivers under difficult conditions (e.g., low light, bad weather, strong ambient light, etc.) and improves the performance of an autonomous navigation system by combining a SPAD circuit, a logic circuit, and a PPD circuit in a pixel for TOF and range measurement by means of controlled charge transferring, photon counting and single-ended to differential conversion. The PPD circuit may have more than one transfer gate and more than one storage node.

FIG. 1 illustrates an exemplary schematic diagram of a four-transistor PPD pixel cell, according to one embodiment.

Referring to FIG. 1, the four-transistor PPD pixel cell 100 includes a PPD 101, a first transistor 103, a second transistor 105, a third transistor 107, and a fourth transistor 109.

The PPD 101 includes an anode connected to a ground potential, and a cathode. The PPD 101 stores charge similar to a capacitor. In one embodiment, the PPD 101 is covered and does not respond to light. The PPD 101 is used as a time-to-charge converter instead of a light sensing element.

The first transistor 103 includes a first terminal connected to the cathode of the PPD 101, a gate terminal for receiving a signal (TX) for transferring charge from the PPD 101, and a third terminal to which charge from the PPD 101 is transferred. The charge transferred is electrons. However, the present disclosure is not limited thereto. In an embodiment, a PPD with a different design may be used, where the charge transferred may be holes.

The second transistor 105 includes a first terminal for receiving voltage for the pixel (VPIX), a gate terminal (FD) connected to the third terminal of the first transistor 103, and a third terminal. The charge on FD is modulated by the TX signal. In one embodiment, a voltage on TX (e.g., VTX) is ramped to gradually transfer charge on the PPD 101 to FD. The amount of charge transferred from the PPD 101 to FD is a function of the TX voltage, and the ramping of the TX voltage is a function of time. Thus, the charge transferred from the PPD 101 to FD is a function of time. If, during the transfer of charge from the PPD 101 to FD, the first transistor 103 is turned off (e.g., becomes open circuited) due to detecting incoming photons, the transfer of charge from the PPD 101 to FD stops, and the amount of charge transferred to FD and the amount of charge remaining on the PPD 101 are both a function of the TOF of the incoming photons. The result is a single-ended to differential conversion. The more charge transferred to FD the more the voltage on FD decreases, and the more the voltage on PPD increases.

The third transistor 107 includes a first terminal for receiving the voltage for the pixel (VPIX), a gate terminal for receiving a signal (RST) for resetting the charge level of FD, and a third terminal connected to the third terminal of the first transistor 103.

The fourth transistor 109 includes a first terminal connected to the third terminal of the second transistor 105, a gate terminal for receiving a signal (SEL) for selecting the pixel to readout either the charge in FD (e.g., a voltage PIXOUT1) or the remaining charge in the PPD 101 after they are transferred to FD completely (e.g., a voltage PIXOUT2), wherein FD converts a charge on it to a voltage, and a third terminal connected to a pixel output data line (PIXOUT) for outputting PIXOUT1 or PIXOUT2. In one embodiment, a ratio of PIXOUT1 to the sum of PIXOUT1 and PIXOUT2 (e.g., the total charge on the PPD 101 at the start of the transfer of charge from the PPD 101 to FD is proportional to the difference between the TOF (e.g., $T_{tof}$) of a light signal received by the pixel and a delay time (e.g., $T_{dly}$), which is the time from the time the light signal was initially sent until VTX starts to ramp, which occurs when an electronic shutter is opened, as expressed in Equation (1) as follows:

$$\left(\frac{Pixout1}{Pixout2 + Pixout2}\right) \propto (T_{tof} - T_{dly}) \quad (1)$$

However, the present disclosure is not limited thereto. The ratio may be used to calculate depth, and is less sensitive to pixel-to-pixel variations when PIXOUT1+PIXOUT2 is not always the same.

In one embodiment, the first transistor 103, the second transistor 105, the third transistor 107, and the fourth transistor 109 may each be one of an n-channel metal oxide semiconductor field effect transistor (NMOSFET) or a p-channel metal oxide semiconductor field effect transistor (PMOSFET). However, the present disclosure is not limited to using NMOSFETs or PMOSEFETs, and any other suitable transistor may be used.

Figure 2:
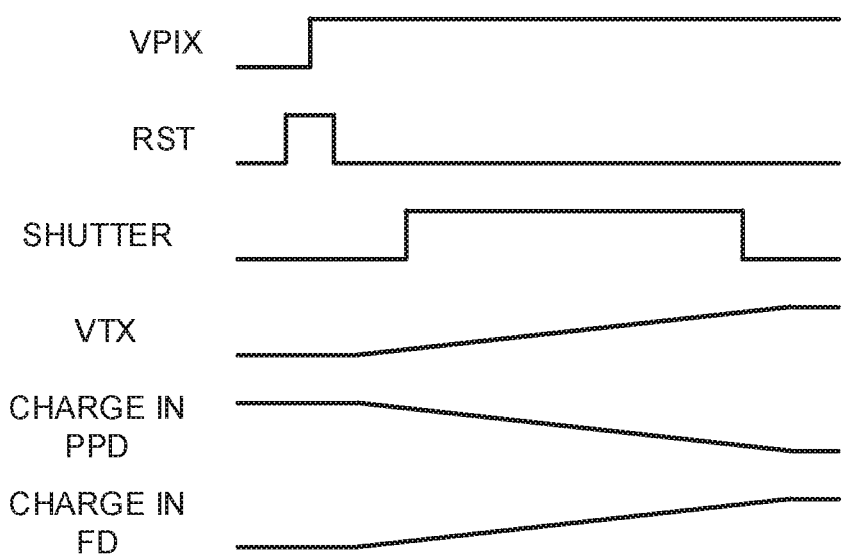
FIG. 2 illustrates a chart of signals of the four-transistor PPD pixel cell illustrated in FIG. 1, according to one embodiment.

FIG. 2 illustrates a chart of signals of the four-transistor PPD pixel cell 100 illustrated in FIG. 1, according to one embodiment.

Referring to FIG. 2, the signals include VPIX, RST, VTX, a voltage (SHUTTER) for controlling an electronic shutter associated with the four-transistor PPD pixel cell 100, a charge in the PPD 101, and a charge in a floating diffusion (FD).

In one embodiment, VPIX may start as a low logic voltage (e.g., logic 0 or 0 volts) to initialize the four-transistor PPD pixel cell 100 and switch to a high logic voltage (e.g., logic 1 or 3 volts (3V)) during operation of the four-transistor PPD pixel cell 100. RST may start with a high logic voltage pulse (e.g., a pulse that goes from logic 0 to logic 1 and back to logic 0) during the initialization of the four-transistor PPD pixel cell 100 to set the charge in a PPD to its full well capacity and set the charge in FD to zero Coulombs (OC). The reset level for FD is a logic 1. During range measurement operation, the more electrons FD receives from the PPD, the lower the voltage on FD becomes. SHUTTER may start with a low logic voltage (e.g., logic 0 or 0V) during the initialization of the four-transistor PPD pixel cell 100, switch to a logic 1 level (e.g., 3 volts) at a time that corresponds to the minimum measurement range during operation of the four-transistor PPD pixel cell 100 to receive a photon (e.g., a photon detection event) from the SPAD circuit which detects light pulse that was transmitted and reflected off of an object, and switch to a logic 0 level (e.g., 0V) at a time that corresponds to the maximum measurement range. A charge in the PPD 101 starts out fully charged during initialization and decreases as VTX is ramped from 0V to a higher voltage, preferably but not limited in a linear fashion, which removes a certain amount of charge from PPD 101, which is a function of how long VTX ramps, and transfers the certain amount of charge from the PPD 101 to FD. A charge in FD starts out at a low charge (e.g., OC) and increases as VTX is ramped from 0V to a higher voltage, which partially transfers a certain amount of charge from the PPD 101 to FD, which is a function of how long VTX ramps.

FIG. 3 illustrates an exemplary schematic diagram of a time-resolving sensor, according to one embodiment.

Referring to FIG. 3, the time-resolving sensor 300 includes a SPAD circuit 301, a logic circuit 303, and a PPD circuit 305.

The SPAD circuit 301 includes a SPAD for detecting photons, a first input for receiving a first voltage (VSPAD), a second input for receiving a first signal (SHUTTER) for controlling opening (turning on) and closing (turning off) an electronic shutter, a third input for receiving a second voltage (VDD), and an output. When the SPAD circuit 301 receives a photon, the SPAD circuit 301 outputs a pulse that goes from VSPAD to 0 sharply and back to VSPAD gradually.

The logic circuit 303 includes a first input connected to the output of the SPAD circuit 301, a second input for receiving a second signal (TXRMD) for completely transferring charge remaining in a PPD of the PPD circuit 305 to a floating diffusion (FD) node, and an output.

The PPD circuit 305 includes a first input connected to the output of the logic circuit 303, a second input for receiving a third signal (VTX) for transferring charge partially or completely from the PPD of the PPD circuit 305 to FD in the PPD circuit 305, a third input for receiving a fourth signal (RST) for resetting the charge in FD and presetting the charge in the PPD, a fourth input for receiving a third voltage (VPIX) for the PPD circuit 305, a fifth input for receiving a fifth signal (SEL) for enabling read out of either a voltage (PIXOUT1) representing the charge on FD or a voltage (PIXOUT2) representing the charge remaining in the PPD of the PPD circuit 305, and an output (PIXOUT) for outputting PIXOUT1 and PIXOUT2 one at a time.

FIG. 4 illustrates an exemplary schematic diagram of the SPAD circuit 301 of the time-resolving sensor of FIG. 3, according to one embodiment.

Referring to FIG. 4, the SPAD circuit 301 includes a resistor 401, a SPAD 403, a capacitor 405, a PMOSFET transistor 407, and a buffer 409.

The resistor 401 includes a first terminal for receiving VSPAD, and a second terminal.

The SPAD 403 includes an anode connected to a ground potential, and a cathode connected to the second terminal of the resistor 401. However, the present disclosure is not limited to the arrangement of the resistor 401 and the SPAD. In one embodiment, the positions of the resistor 401 and the SPAD 403 may be swapped. When the SPAD 403 receives a photon, the SPAD 403 outputs a pulse that goes from VSPAD to 0V and back to VSPAD. The SPAD 403 responds to light.

The capacitor 405 includes a first terminal connected to the cathode of the SPAD 403 and a second terminal. In one embodiment, the capacitor 405 may be eliminated.

The PMOSFET 407 includes a drain connected to the second terminal of the capacitor 405, a gate for receiving SHUTTER, and a source for receiving VPIX.

The buffer 409 includes an input connected to the second terminal of the capacitor 405, and an output, which is the output of the SPAD circuit 301. In one embodiment, the buffer 409 is an inverter.

FIG. 5 illustrates an exemplary schematic diagram of the logic circuit 303 of the time-resolving sensor of FIG. 3, according to one embodiment.

Referring to FIG. 5, the logic circuit 303 includes a latch 501 and a two-input OR gate 503.

The latch 501 includes an input connected to the output of the SPAD circuit 301 and an output. The latch 501 receives the pulse output by the SPAD circuit 301 and outputs a signal that goes from logic 1 to logic 0 and remains at logic 0. In other words, the latch 501 converts a pulse to a signal that goes from logic 1 to logic 0 and remains at logic 0 and does not return to logic 1. The latch output is triggered by the first edge of the SPAD output pulse. The first edge may be positive or negative depending on the SPAD circuit design.

The two-input OR gate 503 includes a first input connected to the output of the latch 501, a second input for receiving a signal (TXRMD), and an output. The output of the two-input OR gate 503 performs a logical OR function. That is, the output of the two-input OR gate 503 goes to a logic 1 if either a photon is received by the SPAD circuit 301 when SHUTTER is a logic 1, and the latch 501 outputs a logic 1, accordingly, or the signal TXRMD is a logic 1, which is for transferring the remaining charge in the PPD of the PPD circuit 305 completely to the FD node for readout.

FIG. 6 illustrates an exemplary schematic diagram of the PPD circuit 305 of the time-resolving sensor of FIG. 3, according to one embodiment.

Referring to FIG. 6, the PPD circuit 305 includes a PPD 601, a first transistor 603, a second transistor 605, a third transistor 607, a fourth transistor 609, and a fifth transistor 611.

The PPD 601 includes an anode connected to a ground potential and a cathode.

The PPD 601 stores charge similar to a capacitor. In one embodiment, the PPD 601 is covered and does not respond to light.

The first transistor 603 includes a first terminal (e.g., a gate) connected to the output of the logic circuit 303, a second terminal (e.g., a drain) for receiving a voltage (VTX), and a third terminal (e.g., a source) at which the voltage TX is provided. The first transistor 603 receives VTX for controlling the transfer of charge from the PPD 601.

The second transistor 605 includes a first terminal (e.g., a gate) connected to the third terminal of the first transistor 603, a second terminal (e.g., a source) connected to the cathode of the PPD 601, and a third terminal (e.g., a drain). The second transistor 605 receives a voltage (TX) on the first terminal and transfers the charge on the PPD 601 on the second terminal to the third terminal (FD).

The third transistor 607 includes a first terminal (e.g., a gate) for receiving RST, a second terminal (e.g., a drain) for receiving VPIX, and a third terminal (e.g., a source) connected to the third terminal of the second transistor 605.

The fourth transistor 609 includes a first terminal (e.g., a gate) connected to the third terminal of the second transistor 605, a second terminal (e.g., a drain) connected to the second terminal of the third transistor 607, and a third terminal (e.g., a source). The charge transferred from the PPD 601 to FD is controlled by the TX signal. In one embodiment, a voltage on TX (e.g., VTX) is ramped to gradually transfer charge from the PPD 601 to FD. The amount of charge transferred from the PPD 601 to FD is a function of the voltage TX, and the ramping of the TX voltage is a function of time. Thus, the charge transferred from the PPD 601 to FD is a function of time. If, during the transfer of charge from the PPD 601 to FD, the second transistor 605 is turned off (e.g., becomes open circuited) due to the SPAD circuit 301 detecting an incoming photon, the transfer of charge from the PPD 601 to FD stops, and the amount of charge transferred to FD and the amount of charge remaining in the PPD 601 are both a function of the TOF of the incoming photon. The result is a time-to-charge conversion and a single-ended to differential signal conversion.

The fifth transistor 611 includes a first terminal (e.g., a gate) for receiving a signal (SEL), a second terminal (e.g., a drain) connected to the third terminal of the fourth transistor 609, and a third terminal (e.g., a source) which is the output PIXOUT of the PPD circuit 305. The fifth transistor 611 receives SEL for selecting the pixel to readout either the charge in FD (e.g., a voltage PIXOUT1) or the remaining charge in the PPD 601 (e.g., a voltage PIXOUT2), wherein FD converts a charge on it to a voltage, and the third terminal connected to a pixel output data line (PIXOUT) outputs PIXOUT1 or PIXOUT2. In one embodiment, a ratio of PIXOUT1 to the sum of PIXOUT1 and PIXOUT2 is proportional to the difference between the TOF (e.g., $T_{tof}$) of a light signal received by the SPAD circuit 301 and a delay time (e.g., $T_{dly}$), which is the time from when the light signal was initially transmitted until VTX starts to ramp, as expressed in Equation (1) above. The delay time may be negative when the light pulse is transmitted after VTX starts to ramp. However, the present disclosure is not limited thereto. The ratio may be used to calculate depth, and is less sensitive to pixel-to-pixel variations when PIXOUT1+PIXOUT2 is not always the same.

In one embodiment, the first transistor 603, the second transistor 605, the third transistor 607, the fourth transistor 609, and the fifth transistor 611 may each be one of an NMOSFET or a PMOSFET. However, the present disclosure is not limited to using NMOSFETs or PMOSEFETs, and any other suitable transistor may be used.

Figure 7:
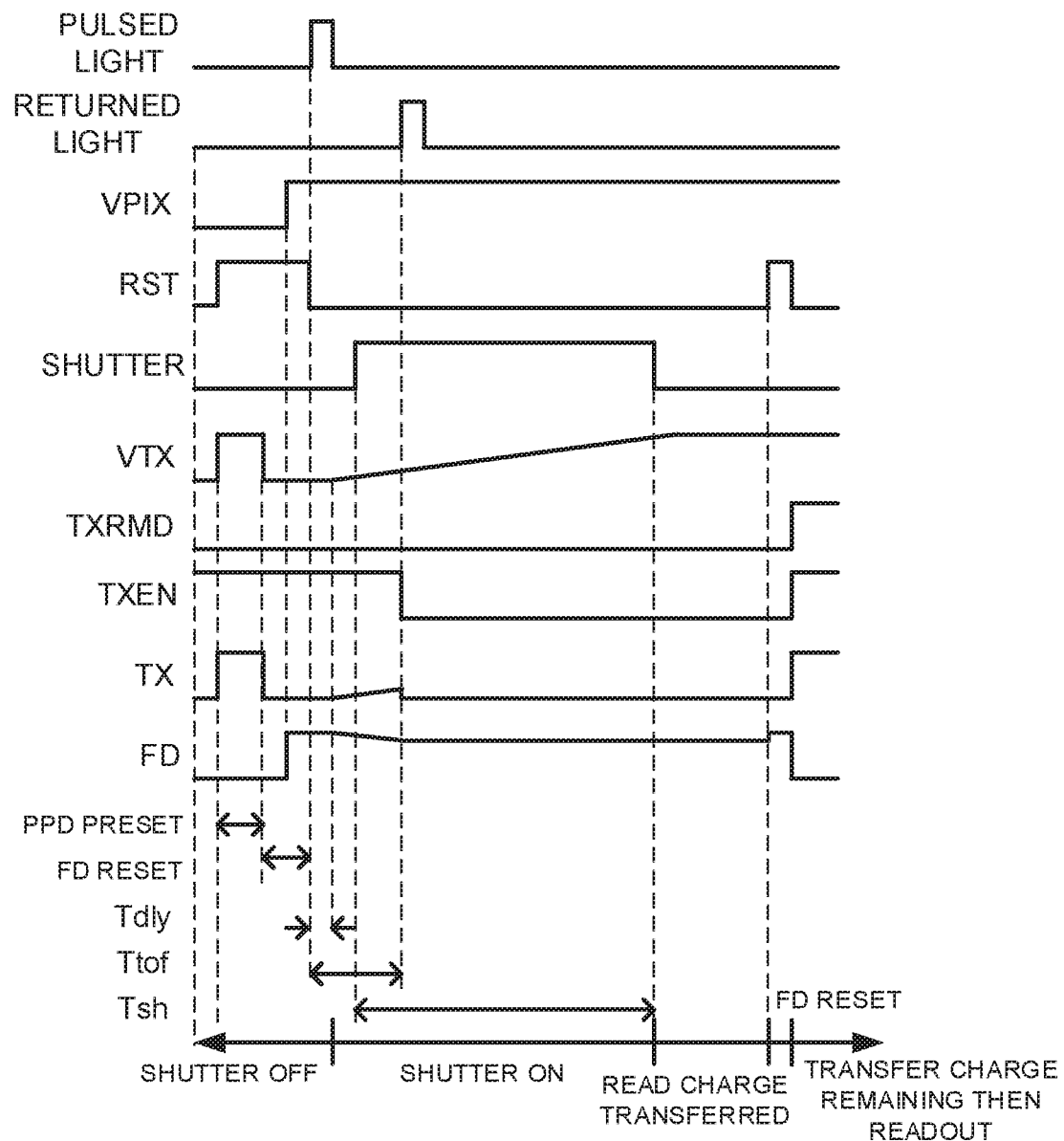
FIG. 7 illustrates a chart of signals and times of the time-resolving sensor of FIG. 3, according to one embodiment.

FIG. 7 illustrates a chart of signals and times of the time-resolving sensor of FIG. 3, according to one embodiment.

Referring to FIG. 7, the signals include a pulsed light, a returned light that is the reflection of the pulsed light off of an item, VPIX, RST, SHUTTER, VTX, TXRMD, TXEN, TX, FD, a PPD preset time when RST, VTX, TXEN, and TX are high, while VPIX, SHUTTER, and TXRMD are low, a first FD reset time from when TX is low until RST turns from high to low, a delay time ($T_{dly}$) from the start of the pulsed light transmitted to when TX starts to ramp, a time of flight ($T_{tof}$) from the start of the pulsed light transmitted to when the returned signal is received, an electronic shutter time ($T_{sh}$) from when the electronic shutter is opened to when the electronic shutter is closed (e.g., when SHUTTER goes from a logic 0 to a logic 1 and then back to a logic 0), and a second FD reset time for the duration of when RST is a logic 1 for a second time. FIG. 7 also illustrates when the electronic shutter is closed (e.g., off), the electronic shutter is open (e.g., on), when the charge on FD after transferring is read out (e.g., when FD voltage is read out through PIXOUT), when FD is reset a second time, and when the remaining charge in PPD 601 is transferred completely to FD and readout (e.g., output to PIXOUT). In one embodiment, Tsh may be less than or equal to the ramping time of VTX.

PPD 601 is filled with charge to its full well capacity at an initialization stage (e.g., PPD Preset). At this time, RST, VTX, TXEN, and TX are high, while VPIX, SHUTTER, and TXRMD are low. Then, VTX goes low to shut off the second transistor 605 of the PPD circuit 305, VPIX goes high to reset PPD 601 to high and transfer charge from it.

In one embodiment, all signal start at logic 0. The PPD 601 is preset when RST, VTX, TXEN, and TX go to a logic 1, and VPIX stays low. FD is reset, while RST is a logic 1, when VTX and TX go to a logic 0 and then VPIX goes to high. After FD is reset to high (e.g., OC in charge domain), VTX is ramped while TXEN is a logic 1. Time of flight (Ttof) is from when the pulsed light is transmitted until return light is received, which is also the time during which charge is transferred partially from the PPD 601 to FD. The shutter is on or open while SHUTTER is a logic 1, and VTX is ramped, which causes an amount of charge in the PPD 601 to be transferred to FD, which is a function of how long VTX ramps. When the transmitted pulse reflects off of an item and is received, the SPAD circuit 301 is pulsed to a logic 0, the logic circuit 303 outputs a static logic 0, which turns off the first transistor 603 and the second transistor 605, which stops the transfer of charge to FD from the PPD 601. When SHUTTER goes to a logic 0 and SEL goes to a logic 1, the charge in FD is output as a voltage PIXOUT1 to PIXOUT, wherein FD converts a charge on it to a voltage. Then, when TXRMD goes to a logic 1, the remaining charge in the PPD 601 is transferred to FD completely and output as a voltage PIXOUT2 onto PIXOUT.

Figure 8:
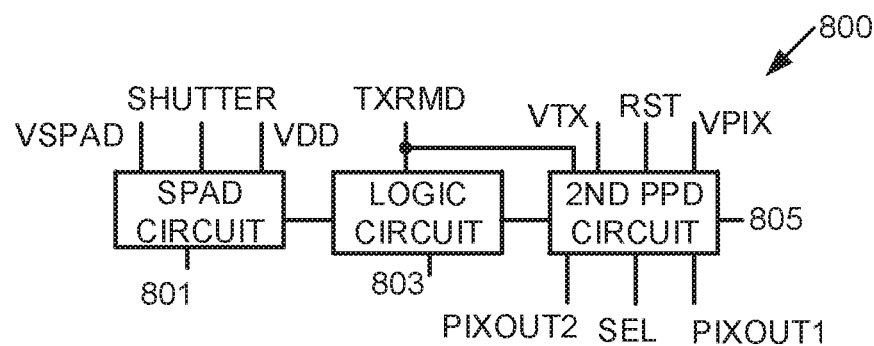
FIG. 8 illustrates an exemplary schematic diagram of a time-resolving sensor, according to one embodiment.

FIG. 8 illustrates an exemplary schematic diagram of a time-resolving sensor, according to one embodiment.

Referring to FIG. 8, the time-resolving sensor 800 includes a SPAD circuit 801, a logic circuit 803, and a second PPD circuit 805.

The SPAD circuit 801 includes a SPAD for detecting photons, a first input for receiving a first voltage (VSPAD), a second input for receiving a first signal (SHUTTER) for controlling opening (turning on) and closing (turning off) an electronic shutter, a third input for receiving a second voltage (VDD), and an output. When the SPAD circuit 801 receives a photon, the SPAD circuit 801 outputs a pulse that goes from VSPAD to 0 sharply and back to VSPAD gradually. The SPAD circuit 801 may be the same as the SPAD circuit 301 of FIG. 3 described above.

The logic circuit 803 includes a first input connected to the output of the SPAD circuit 801, a second input for receiving a second signal (TXRMD) for completely transferring charge remaining in a PPD of the second PPD circuit 805, and an output. The logic circuit 803 may be the same as the logic circuit 303 of FIG. 3 described above.

The second PPD circuit 805 includes a first input connected to the output of the logic circuit 803, a second input connected to the second input of the logic circuit 803 for receiving TXRMD, a third input for receiving a third signal (VTX) for transferring charge partially or completely from the PPD of the second PPD circuit 805 to a floating diffusion (FD1) node in the second PPD circuit 805, a fourth input for receiving a fourth signal (RST) for resetting the charge in FD1 and presetting the charge in the PPD, a fifth input for receiving a third voltage (VPIX) for the second PPD circuit 805, a sixth input for receiving a fifth signal (SEL) for enabling read out of either a voltage (PIXOUT1) representing the charge on FD1 on a first output (PIXOUT1) and enabling read out of a voltage (PIXOUT2) representing the charge remaining in the PPD of the second PPD circuit 805 on a second output (PIXOUT2), a first output (PIXOUT1) for outputting PIXOUT1, and a second output (PIXOUT2) for outputting PIXOUT2.

Figure 9:
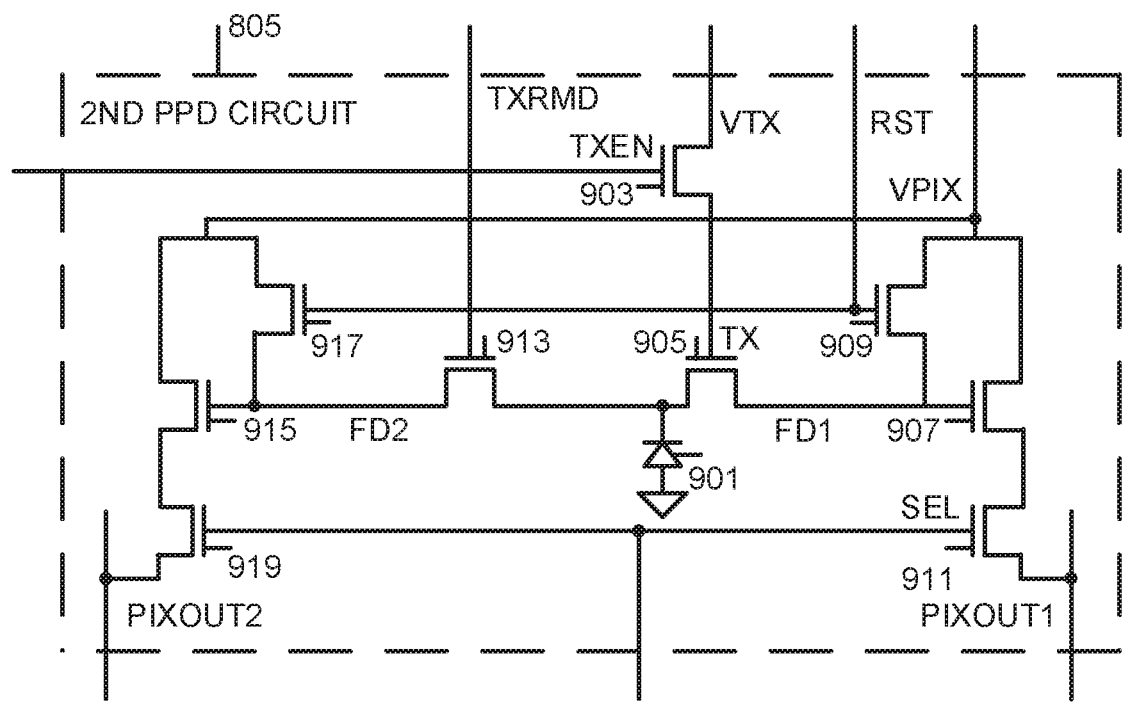
FIG. 9 illustrates an exemplary schematic diagram of a PPD circuit of the time-resolving sensor of FIG. 8, according to one embodiment.

FIG. 9 illustrates an exemplary schematic diagram of the second PPD circuit 805 of the time-resolving sensor of FIG. 8, according to one embodiment.

Referring to FIG. 9, the second PPD circuit 805 includes a PPD 901, a first transistor 903, a second transistor 905, a third transistor 907, a fourth transistor 909, a fifth transistor 911, a sixth transistor 913, a seventh transistor 915, an eighth transistor 917, and a ninth transistor 919.

The PPD 901 includes an anode connected to a ground potential, and a cathode. The PPD 901 stores charge similar to a capacitor. In one embodiment, the PPD 901 is covered and does not respond to light.

The first transistor 903 includes a first terminal (e.g., a gate) connected to the output of the logic circuit 803 for receiving a voltage (TXEN), a second terminal (e.g., a drain) for receiving a voltage (VTX) for controlling the transfer of charge from the PPD 901, and a third terminal (e.g., a source).

The second transistor 905 includes a first terminal (e.g., a gate) connected to the third terminal of the first transistor 903 for receiving a signal (TX) for transferring charge from the PPD 901, a second terminal (e.g., a source) connected to the cathode of the PPD 901, and a third terminal (e.g., a first floating diffusion FD1) to which charge is transferred from the PPD 901.

The third transistor 907 includes a first terminal (FD1) (e.g., a gate) connected to the third terminal of the second transistor 905, a second terminal (e.g., a drain) for receiving a voltage (VPIX), and a third terminal (e.g., a source). The charge transferred from the PPD 901 to FD1 is controlled by the TX signal. In one embodiment, a voltage on TX (e.g., VTX) is ramped to gradually transfer charge from the PPD 901 to FD1. FD1 has a first capacitance. The amount of charge transferred from the PPD 901 to FD1 is a function of the voltage TX, and the ramping of the TX voltage is a function of time. Thus, the charge transferred from the PPD 901 to FD1 is a function of time. If, during the transfer of charge from the PPD 901 to FD1, the second transistor 905 is turned off (e.g., becomes open circuited) due to the SPAD circuit 801 detecting an incoming photon, the transfer of charge from the PPD 901 to FD1 stops, and the amount of charge transferred to FD1 and the amount of charge remaining in the PPD 901 are both a function of the TOF of the incoming photon. The result is a time-to-charge conversion.

The fourth transistor 909 includes a first terminal (e.g., a gate) for receiving a signal (RST) for setting the charge level of FD1, a second terminal (e.g., a drain) for receiving VPIX, and a third terminal connected to the third terminal of the second transistor 905.

The fifth transistor 911 includes a first terminal (e.g., a gate) for receiving a signal (SEL) for reading out the charge in FD1, a second terminal (e.g., a drain) connected to the third terminal of the third transistor 907, and a third terminal connected to an output data line (PIXOUT1) for outputting the charge in FD1 as a voltage PIXOUT1, where FD1 converts a charge on FD1 to a voltage.

The sixth transistor 913 includes a first terminal (e.g., a gate) for receiving a signal (TXRMD) for transferring charge remaining in the PPD 901 to FD2 completely, a second terminal (e.g., a drain) connected to the cathode of the PPD 901, and a third terminal (e.g., node FD2) to which the charge remaining in the PPD 901 is transferred.

The seventh transistor 915 includes a first terminal (e.g., a gate) connected to the third terminal (e.g., node FD2) of the sixth transistor 913, a second terminal for receiving VPIX, and a third terminal. FD2 has a second capacitance. In one embodiment, the second capacitance of FD2 is equal to the first capacitance of FD1.

The eighth transistor 917 includes a first terminal (e.g., a gate) for receiving RST for setting the charge level of FD2, a second terminal for receiving VPIX, and a third terminal connected to the third terminal of the sixth transistor 913.

The ninth transistor 919 includes a first terminal (e.g., a gate) for receiving a signal (SEL) for selecting the pixel to readout the charge in FD2, a second terminal connected to the third terminal of the seventh transistor 915, and a third terminal connected to a pixel output data line (PIXOUT2) for outputting FD2 as a voltage PIXOUT2. In one embodiment, a ratio of PIXOUT1 to the sum of PIXOUT1 and PIXOUT2 is proportional to the TOF of the received photon (e.g., a difference between the TOF (e.g., $T_{tof}$) of a light signal received by the SPAD circuit 801 and a delay time (e.g., $T_{dly}$), which is the time from the time the light signal was initially sent until VTX starts to ramp, as expressed in Equation (1) above). The delay time may be negative when the light pulse is transmitted after VTX starts to ramp. The result is a time-resolving sensor 800 in a dual port pixel. However, the present disclosure is not limited thereto. The ratio may be used to calculate depth, and is less sensitive to pixel-to-pixel variations when PIXOUT1+PIXOUT2 is not always the same.

In one embodiment, the first transistor 903, the second transistor 905, the third transistor 907, the fourth transistor 909, the fifth transistor 911, the sixth transistor 913, the seventh transistor 915, the eighth transistor 917, and the ninth transistor 919 may each be one of an NMOSFET or a PMOSFET. However, the present disclosure is not limited to using NMOSFETs or PMOSEFETs, and any other suitable transistor may be used.

Figure 10:
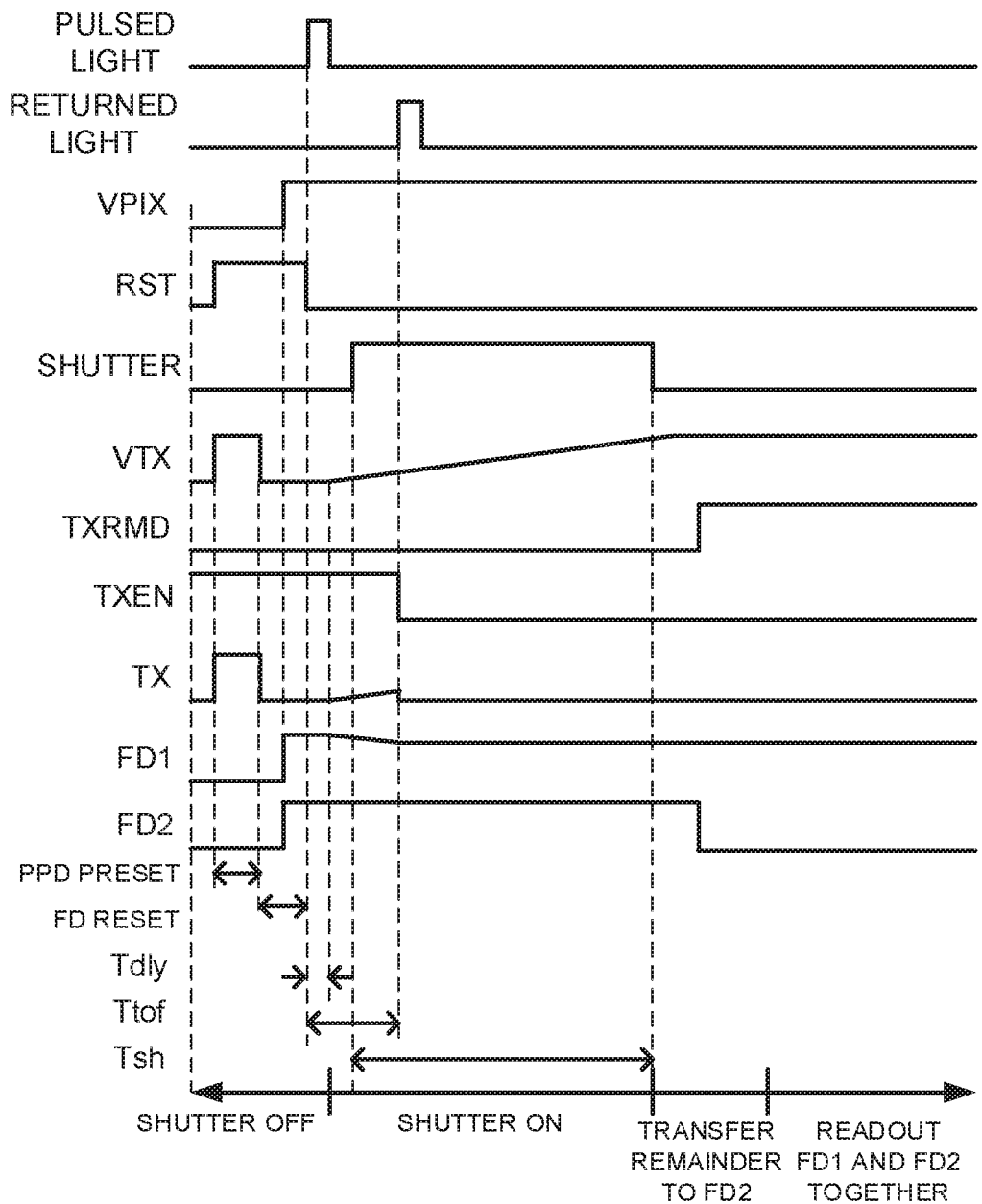
FIG. 10 illustrates a chart of signals and times of the time-resolving sensor of FIG. 8, according to one embodiment.

FIG. 10 illustrates a chart of signals and times of the time-resolving sensor of FIG. 8, according to one embodiment.

Referring to FIG. 10, the signals include a pulsed light, a returned light that is the reflection of the pulsed light off of an item, VPIX, RST, SHUTTER, VTX, TXRMD, TXEN, TX, FD1, FD2, a PPD preset time, an FD reset time, a delay time ($T_{dly}$), a time of flight ($T_{tof}$), and an electronic shutter time ($T_{sh}$). FIG. 10 also illustrates when the electronic shutter is closed (e.g., off), the electronic shutter is open (e.g., on), when a read charge is transferred (e.g., when FD1 is output to PIXOUT1), and when the remaining charge in PPD 901 is transferred and readout (e.g., FD2 is output to PIXOUT2). In one embodiment, Tsh may be less than or equal to the ramping time of VTX.

PPD 901 is filled with charge at an initialization stage stage (e.g., PPD Preset).

Figure 11:
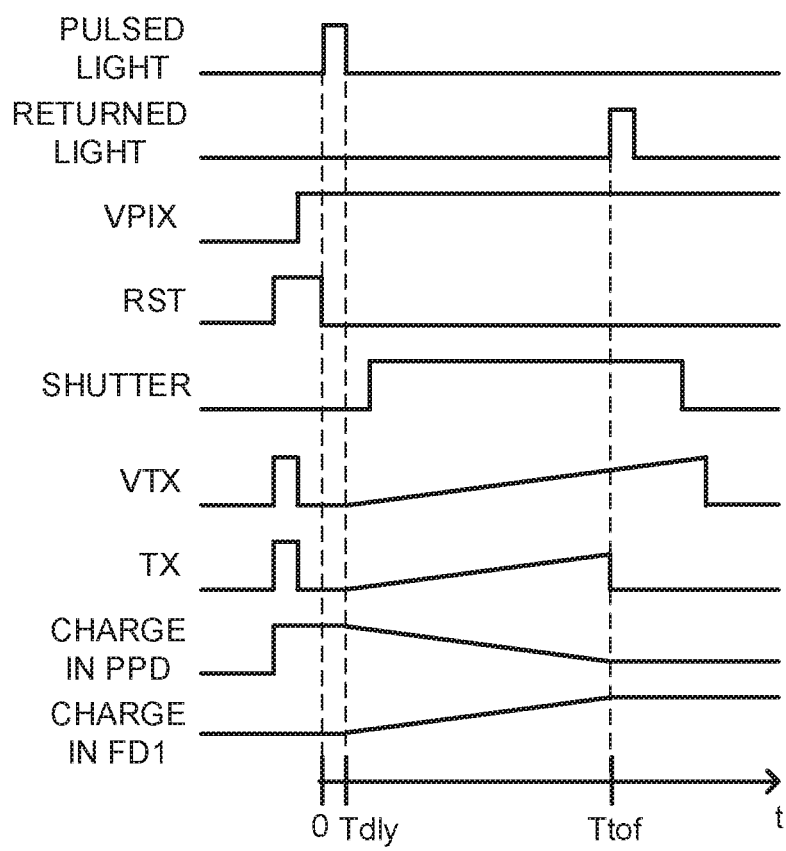
FIG. 11 illustrates a chart of signals of the time-resolving sensor of FIG. 8, according to one embodiment.

FIG. 11 illustrates a chart of signals of the time-resolving sensor of FIG. 8, according to one embodiment.

Referring to FIG. 11, the signals include the pulsed light, the returned light, VPIX, RST, SHUTTER, VTX, TX, the charge in PPD 901, and the charge in FD1.

Figure 12:
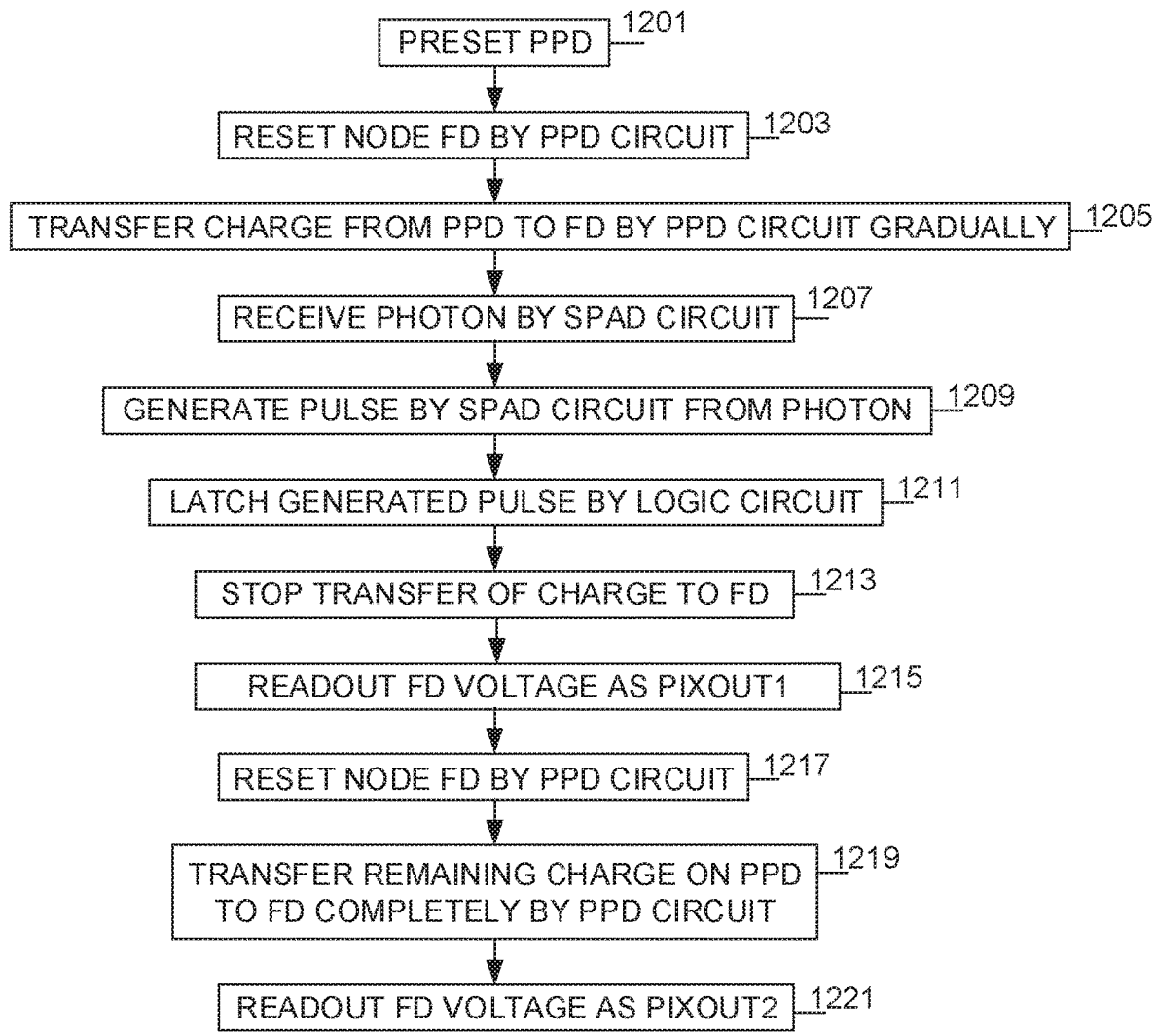
FIG. 12 illustrates an exemplary flowchart of a method of a time-resolving sensor of FIG. 3, according to one embodiment.

FIG. 12 illustrates an exemplary flowchart of a method of a time-resolving sensor of FIG. 3, according to one embodiment. In one embodiment, the PPD is covered and does not respond to light. However, a SPAD in the SPAD circuit 301 responds to light.

Referring to FIG. 12, a PPD is preset by a PPD circuit, at step 1201.

At 1203, an FD node is reset by the PPD circuit.

At 1205, a charge on the PPD is gradually transferred to FD by the PPD circuit.

At 1207, at least one photon is received by a SPAD circuit.

At 1209, a pulse is generated by the SPAD circuit.

At 1211, the pulse generated by the SPAD circuit is latched by a logic circuit.

At 1213, the transfer of charge from the PPD to FD is stopped by the PPD circuit.

At 1215, the voltage on FD is readout onto PIXOUT1.

At step 1217, FD is reset by the PPD circuit.

At step 1219, a remaining charge in the PPD is completely transferred to FD.

At step 1221, the voltage on FD is readout onto PIXOUT2. In one embodiment, a ratio of PIXOUT1 to a sum of PIXOUT1 and PIXOUT2 is proportional to the TOF of the received photon (e.g., a difference between a TOF (e.g., $T_{tof}$) of a light signal received by the SPAD core and a delay time (e.g., $T_{dly}$), which is a time from when a light signal is initially transmitted until VTX starts to ramp, which occurs when an electronic shutter signal controls an electronic shutter to open, as expressed in Equation (1) above). However, the present disclosure is not limited thereto. The ratio may be used to calculate depth, and is less sensitive to pixel-to-pixel variations when PIXOUT1+PIXOUT2 is not always the same.

Figure 13:
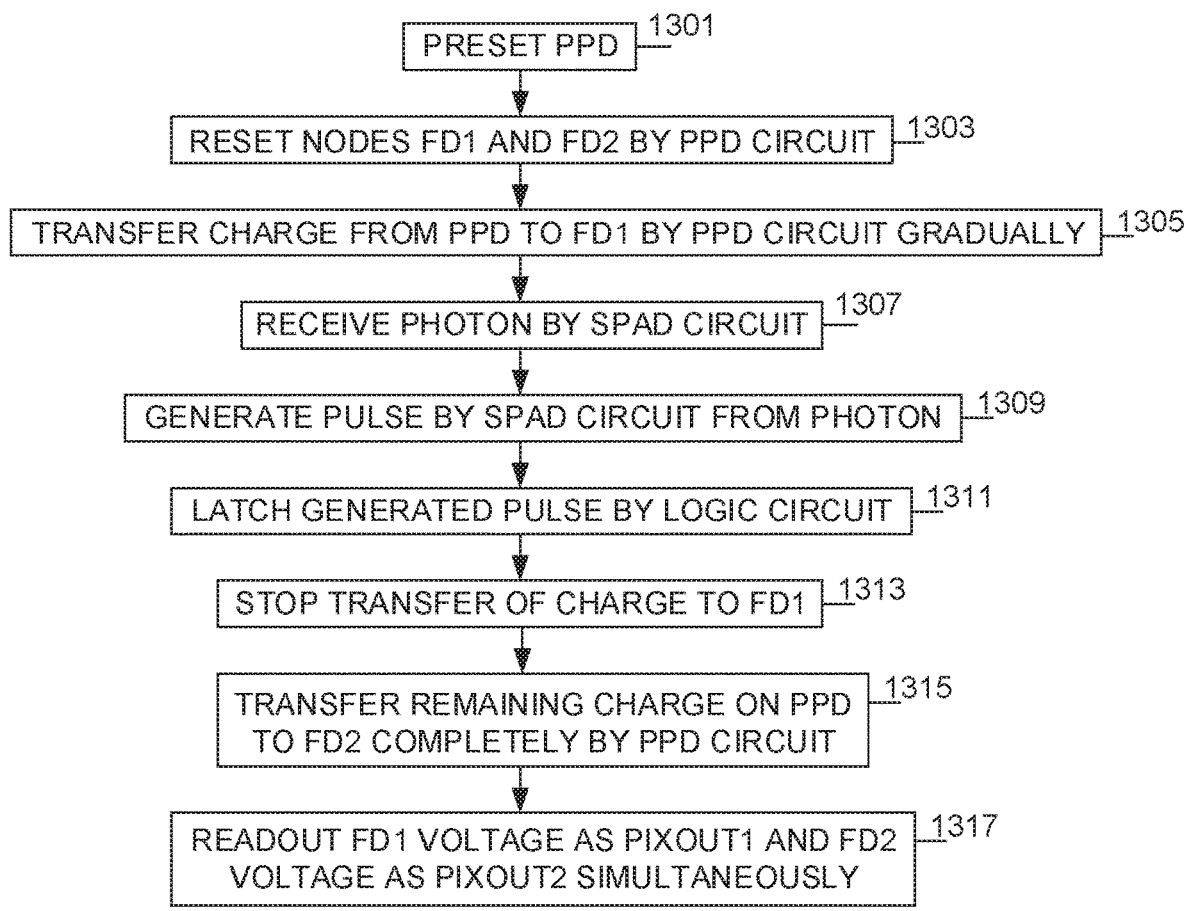
FIG. 13 illustrates an exemplary flowchart of a method of a time-resolving sensor of FIG. 8, according to one embodiment.

FIG. 13 illustrates an exemplary flowchart of a method of a time-resolving sensor of FIG. 8, according to one embodiment. In one embodiment, the PPD is covered and does not respond to light. However, a SPAD in the SPAD circuit responds to light.

Referring to FIG. 13, a PPD is preset by a PPD circuit, at 1301.

At 1303, nodes FD1 and FD2 are reset by the PPD circuit.

At 1305, charge is gradually transferred from the PPD to FD1 by the PPD circuit.

At 1307, a photon is received by a SPAD circuit.

At 1309, a pulse is generated by the SPAD circuit from the received photon.

At 1311, the pulse generated by the SPAD circuit is latched by a logic circuit.

At 1313, the transfer of charge from the PPD to FD1 is stopped by the PPD circuit.

At 1315, charge remaining in the PPD is completely transferred to FD2 by the PPD circuit.

At 1317, the voltages on FD1 and FD2 are readout as PIXOUT1 and PIXOUT2 simultaneously. In one embodiment, the ratio of PIXOUT1 to the sum of PIXOUT1 and PIXOUT2 is proportional to the difference between a TOF (e.g., $T_{tof}$) of a light signal received by the SPAD circuit and a delay time (e.g., $T_{dly}$), which is the time from when the light signal was initially sent until VTX starts to ramp, which occurs when the electronic shutter signal controls an electronic shutter to open, as expressed in Equation (1) above. However, the present disclosure is not limited thereto. The ratio may be used to calculate depth, and is less sensitive to pixel-to-pixel variations when PIXOUT1+PIXOUT2 is not always the same.

Figure 14:
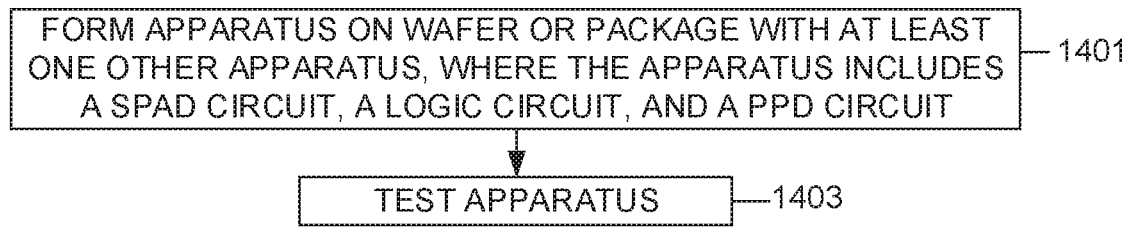
FIG. 14 illustrates an exemplary flowchart of a method of manufacturing a time-resolving sensor, according to one embodiment.

FIG. 14 illustrates an exemplary flowchart of a method of manufacturing a time-resolving sensor, according to one embodiment. In one embodiment, a PPD is covered and does not respond to light. However, a SPAD in a SPAD circuit responds to light.

Referring to FIG. 14, an apparatus is formed on a wafer or a package with at least one other apparatus, where the apparatus includes a SPAD circuit, a logic circuit, and a PPD circuit, at 1401. In one embodiment, a ratio of PIXOUT1/(PIXOUT1+PIXOUT2) is proportional to a TOF of a received photon. However, the present disclosure is not limited thereto. The ratio may be used to calculate depth, and is less sensitive to pixel-to-pixel variations when PIXOUT1+PIXOUT2 is not always the same.

At 1402, the apparatus is tested. Testing the apparatus may include testing the apparatus using one or more electrical to optical converters, one or more optical splitters that split an optical signal into two or more optical signals, and one or more optical to electrical converters.

Figure 15:
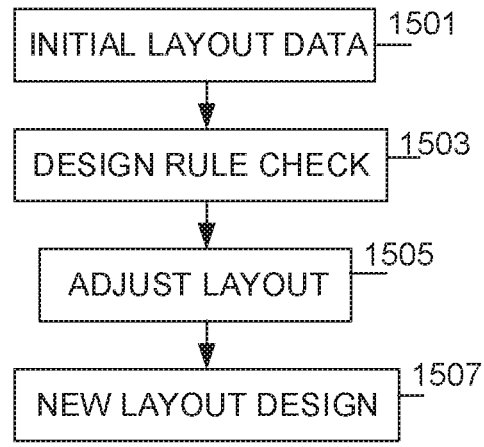
FIG. 15 illustrates an exemplary flowchart of a method of constructing an integrated circuit, according to one embodiment.

FIG. 15 illustrates an exemplary flowchart of a method of constructing an integrated circuit, according to one embodiment.

Referring to FIG. 15, initial layout data is constructed in 1501. For example, a mask layout is generated for a set of features for a layer of the integrated circuit, wherein the mask layout includes standard cell library macros for one or more circuit features that include an apparatus that includes a SPAD circuit, a logic circuit, and a PPD circuit. In one embodiment, a ratio of PIXOUT1/(PIXOUT1+PIXOUT2) is proportional to a TOF of a received photon, and disregarding relative positions of the macros for compliance to layout design rules during the generation of the mask layout. However, the present disclosure is not limited thereto. The ratio may be used to calculate depth, and is less sensitive to pixel-to-pixel variations when PIXOUT1+PIXOUT2 is not always the same. In one embodiment, a PPD in the four-transistor PPD pixel cell is covered and does not respond to light. However, a SPAD in the SPAD circuit responds to light.

At 1503, a design rule check is performed. For example, the method may check the relative positions of the macros for compliance to layout design rules after generating the mask layout.

At 1505, the layout is adjusted. For example, the method, upon detection of noncompliance with the layout design rules by any of the macros, may modify the mask layout by modifying each of the noncompliant macros to comply with the layout design rules.

At 1507, new layout data is generated. For example, the method may generate a mask according to the modified mask layout with the set of features for the layer of the integrated circuit. Then, the integrated circuit layer according to the mask may be manufactured.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
   a single-photon avalanche diode (SPAD) circuit configured to detect a photon, including a first input for receiving a first voltage (VSPAD), a second input for receiving a first signal (SHUTTER), a third input for receiving a second voltage (VDD), and an output;
   a logic circuit configured to latch the detected photon, including a first input connected to the output of the SPAD circuit, a second input for receiving a second signal (TXRMD), and an output; and
   a pinned photo diode (PPD) circuit configured to record a time of flight (TOF) of the detected photon, including a first input connected to the output of the logic circuit, a second input for receiving a third signal (VTX), a third input for receiving a fourth signal (RST), a fourth input for receiving a third voltage (VPIX), a fifth input for receiving a fifth signal (SEL), and an output.

2. The apparatus of claim 1, wherein the SPAD circuit comprises:
   a resistor, including a first terminal for receiving VSPAD, and a second terminal;
   a SPAD for detecting photons, including an anode connected to a ground potential, and a cathode connected to the second terminal of the resistor;
   a capacitor, including a first terminal connected to the cathode of the PPD, and a second terminal;
   a p-channel metal oxide semiconductor field effect transistor (PMOSFET), including a first terminal for receiving SHUTTER, a second terminal for receiving VDD, and a third terminal connected to the second terminal of the capacitor;
   and a buffer, including an input connected to the second terminal of the capacitor, and an output.

3. The apparatus of claim 1, wherein the logic circuit comprises:
   a latch, including an input connected to the output of the SPAD circuit, and an output; and a two-input OR gate, including a first input connected to the output of the latch, a second input for receiving TXRMD for completely transferring charge remaining in a PPD in the PPD circuit to a floating diffusion (FD) node, and an output.

4. The apparatus of claim 1, wherein the PPD circuit is comprised of:
a PPD, including an anode connected to a ground potential, and a cathode;
a first transistor, including a first terminal connected to the output of the logic circuit, a second terminal for receiving VTX for transferring charge partially or completely from the PPD to a floating diffusion (FD) node in the PPD circuit, and a third terminal;
a second transistor, including a first terminal connected to the third terminal of the first transistor, a second terminal connected to the cathode of the PPD, and a third terminal connected to FD;
a third transistor, including a first terminal for receiving RST for resetting a charge in FD and presetting a charge in the PPD, a second terminal for receiving VPIX, and a third terminal connected to the third terminal of the second transistor;
a fourth transistor, including a first terminal connected to the third terminal of the second transistor, a second terminal for receiving VPIX, and a third terminal; and
a fifth transistor, including a first terminal for receiving SEL for enabling read out of either a first output voltage (PIXOUT1) representing the charge on FD or a second output voltage (PIXOUT2) representing the charge remaining in the PPD, a second terminal connected to the third terminal of the fourth transistor, and a third terminal for outputting PIXOUT1 and PIXOUT2.

5. The apparatus of claim 4, wherein the first transistor, the second transistor, the third transistor, and the fourth transistor are each selected from either an n-channel metal oxide semiconductor field effect transistor (NMOSFET) or a p-channel metal oxide semiconductor field effect transistor (PMOSFET).

6. The apparatus of claim 4, wherein the PPD is configured as a time-to-charge converter.

7. An apparatus, comprising:
a single-photon avalanche diode (SPAD) circuit configured to detect a photon, including a first input for receiving a first voltage (VSPAD), a second input for receiving a first signal (SHUTTER), a third input for receiving a second voltage (VDD), and an output;
a logic circuit configured to latch the detected photon, including a first input connected to the output of the SPAD circuit, a second input for receiving a second signal (TXRMD) for completely transferring charge remaining in a PPD in a pinned photo diode (PPD) circuit, and an output; and
the PPD circuit configured to record a time of flight (TOF) of the detected photon, including a first input connected to the output of the logic circuit, a second input connected to the second input of the logic circuit, a third input for receiving a third signal (VTX), a fourth input for receiving a fourth signal (RST), a fifth input for receiving a third voltage (VPIX), a sixth input for receiving a fifth signal (SEL), a first output, and a second output.

8. The apparatus of claim 7, wherein the SPAD circuit comprises:
a resistor, including a first terminal for receiving VSPAD, and a second terminal;

a SPAD for detecting photons, including an anode connected to a ground potential, and a cathode connected to the second terminal of the resistor;
a capacitor, including a first terminal connected to the cathode of the PPD, and a second terminal;
a p-channel metal oxide semiconductor field effect transistor (PMOSFET), including a first terminal for receiving SHUTTER, a second terminal for receiving VDD, and a third terminal connected to the second terminal of the capacitor;
and a buffer, including an input connected to the second terminal of the capacitor, and an output.

9. The apparatus of claim 7, wherein the logic circuit comprises:
a latch, including an input connected to the output of the SPAD circuit, and an output; and
a two-input OR gate, including a first input connected to the output of the latch, a second input for receiving TXRMD for completely transferring charge remaining in a PPD in the PPD circuit to a floating diffusion (FD) node, and an output.

10. The apparatus of claim 7, wherein the PPD circuit is comprised of:
a PPD, including an anode connected to a ground potential, and a cathode;
a first transistor, including a first terminal connected to the output of the logic circuit, a second terminal for receiving VTX for transferring charge partially from the PPD to a first floating diffusion (FD1) node in the PPD circuit, and a third terminal;
a second transistor, including a first terminal connected to the third terminal of the first transistor, a second terminal connected to the cathode of the PPD, and a third terminal connected to FD1, wherein FD1 has a first capacitance;
a third transistor, including a first terminal connected to the third terminal of the second transistor, a second terminal for receiving VPIX, and a third terminal;
a fourth transistor, including a first terminal for receiving RST for resetting a charge in FD1 and a second floating diffusion (FD2), a second terminal for receiving VPIX, and a third terminal connected to the third terminal of the second transistor;
a fifth transistor, including a first terminal for receiving SEL for enabling read out of either a first output voltage (PIXOUT1) representing a charge on FD1 and enabling read out of a second output voltage (PIXOUT2) representing a charge remaining on the PPD, a second terminal connected to the third terminal of the third transistor, and a third terminal for outputting PIXOUT1;
a sixth transistor, including a firth terminal for receiving TXRMD, a second terminal connected to the second terminal of the second transistor, and a third terminal connected to FD2, wherein FD2 has a second capacitance equal to the first capacitance of FD1;
a seventh transistor, including a first terminal connected to the third terminal of the sixth transistor, a second terminal for receiving VPIX, and a third terminal;
an eighth transistor, including a first terminal for receiving RST, a second terminal for receiving VPIX, and a third terminal connected to the third terminal of the sixth transistor; and
a ninth transistor, including a first terminal for receiving SEL, a second terminal connected to the third terminal of the seventh transistor, and a third terminal for outputting PIXOUT2.

11. The apparatus of claim 10, wherein the first transistor, the second transistor, the third transistor, the fourth transistor, the fifth transistor, the sixth transistor, the seventh transistor, the eighth transistor, and the ninth transistor are each selected from either an n-channel metal oxide semiconductor field effect transistor (NMOSFET) or a p-channel metal oxide semiconductor field effect transistor (PMOSFET).

12. The apparatus of claim 10, wherein the PPD is configured as a time-to-charge converter.

13. A method, comprising:
presetting, by a pinned photodiode (PPD) circuit, a PPD;
resetting, by the PPD circuit, a floating diffusion (FD) node;
transferring, by the PPD circuit, charge from the PPD to FD;
receiving a photon, by a single-photon avalanche diode (SPAD) circuit;
generating, by the SPAD circuit, a pulse;
latching, by a logic circuit, the generated pulse;
stopping, by the PPD circuit, the transfer of charge from the PPD to FD;
reading out, by the PPD circuit, a voltage on FD as PIXOUT1;
resetting FD by the PPD circuit;
transferring completely a remaining charge on the PPD to FD by the PPD circuit; and
reading out the voltage on FD as PIXOUT2.

14. The method of claim 13, wherein the PPD circuit is comprised of:
a PPD, including an anode connected to a ground potential, and a cathode;
a first transistor, including a first terminal connected to the output of the logic circuit, a second terminal for receiving a first signal (VTX) for transferring charge partially or completely from the PPD to a floating diffusion (FD) node in the PPD circuit, and a third terminal;
a second transistor, including a first terminal connected to the third terminal of the first transistor, a second terminal connected to the cathode of the PPD, and a third terminal connected to FD;
a third transistor, including a first terminal for receiving a reset signal (RST) for resetting a charge in FD and presetting a charge in the PPD, a second terminal for receiving a first voltage (VPIX), and a third terminal connected to the third terminal of the second transistor;
a fourth transistor, including a first terminal connected to the third terminal of the second transistor, a second terminal for receiving VPIX, and a third terminal; and
a fifth transistor, including a first terminal for receiving a selection signal (SEL) for enabling read out of either a first output voltage (PIXOUT1) representing the charge on FD or a second output voltage (PIXOUT2) representing the charge remaining in the PPD, a second terminal connected to the third terminal of the fourth transistor, and a third terminal for outputting PIXOUT1 and PIXOUT2.

15. The apparatus of claim 14, wherein the first transistor, the second transistor, the third transistor, and the fourth transistor are each selected from either an n-channel metal oxide semiconductor field effect transistor (NMOSFET) or a p-channel metal oxide semiconductor field effect transistor (PMOSFET).

16. The method of claim 14, wherein the PPD is configured as a time-to-charge converter.

17. A method, comprising:
presetting, by a pinned photodiode (PPD) circuit, a PPD;
resetting, by the PPD circuit, floating diffusion nodes FD1 and FD2;
transferring gradually, by the PPD circuit, charge from the PPD to FD1;
receiving a photon, by a single-photon avalanche diode (SPAD) circuit;
generating, by the SPAD circuit, a pulse;
latching, by a logic circuit, the generated pulse;
stopping, by the PPD circuit, the transfer of charge from the PPD to FD1;
transferring completely, by the PPD circuit, charge remaining in the PPD to FD2; and
reading out simultaneously a voltage on FD1 as PIXOUT1 and a voltage on FD2 as PIXOUT2.

18. The method of claim 17, wherein the PPD circuit is comprised of:
a PPD, including an anode connected to a ground potential, and a cathode;
a first transistor, including a first terminal connected to the output of the logic circuit, a second terminal for receiving a first signal (VTX) for transferring charge partially from the PPD to a first floating diffusion (FD1) node in the PPD circuit, and a third terminal;
a second transistor, including a first terminal connected to the third terminal of the first transistor, a second terminal connected to the cathode of the PPD, and a third terminal connected to FD1, wherein FD1 has a first capacitance;
a third transistor, including a first terminal connected to the third terminal of the second transistor, a second terminal for receiving a first voltage (VPIX), and a third terminal;
a fourth transistor, including a first terminal for receiving a reset signal (RST) for resetting a charge in FD1 and a second floating diffusion (FD2), a second terminal for receiving VPIX, and a third terminal connected to the third terminal of the second transistor;
a fifth transistor, including a first terminal for receiving a selection signal (SEL) for enabling read out of either a first output voltage (PIXOUT1) representing a charge on FD1 and enabling read out of a second output voltage (PIXOUT2) representing a charge remaining on the PPD, a second terminal connected to the third terminal of the third transistor, and a third terminal for outputting PIXOUT1;
a sixth transistor, including a firth terminal for receiving a transfer remaining charge signal (TXRMD), a second terminal connected to the second terminal of the second transistor, and a third terminal connected to FD2, wherein FD2 has a second capacitance equal to the first capacitance of FD1;
a seventh transistor, including a first terminal connected to the third terminal of the sixth transistor, a second terminal for receiving VPIX, and a third terminal;
an eighth transistor, including a first terminal for receiving RST, a second terminal for receiving VPIX, and a third terminal connected to the third terminal of the sixth transistor; and
a ninth transistor, including a first terminal for receiving SEL, a second terminal connected to the third terminal of the seventh transistor, and a third terminal for outputting PIXOUT2.

19. A method of manufacturing an apparatus, comprising:
forming the apparatus on a wafer or a package with at least one other apparatus, wherein the apparatus comprises a single-photon avalanche diode (SPAD) circuit, a logic circuit, and a pinned photo diode (PPD) circuit; and testing the apparatus, wherein testing the coarse timing and frequency synchronization apparatus comprises testing the apparatus using one or more electrical to optical converters, one or more optical splitters that split an optical signal into two or more optical signals, and one or more optical to electrical converters.

20. A method of constructing an integrated circuit, comprising:

generating a mask layout for a set of features for a layer of the integrated circuit, wherein the mask layout includes standard cell library macros for one or more circuit features that include an apparatus comprising a single-photon avalanche diode (SPAD) circuit, a logic circuit, and a pinned photo diode (PPD) circuit;

disregarding relative positions of the macros for compliance to layout design rules during the generation of the mask layout;

checking the relative positions of the macros for compliance to layout design rules after generating the mask layout;

upon detection of noncompliance with the layout design rules by any of the macros, modifying the mask layout by modifying each of the noncompliant macros to comply with the layout design rules;

generating a mask according to the modified mask layout with the set of features for the layer of the integrated circuit; and manufacturing the integrated circuit layer according to the mask.

* * * * *